J. D. MARVIL.
WHEEL TIRE.
APPLICATION FILED JAN. 18, 1909.
980,808.
Patented Jan. 3, 1911.
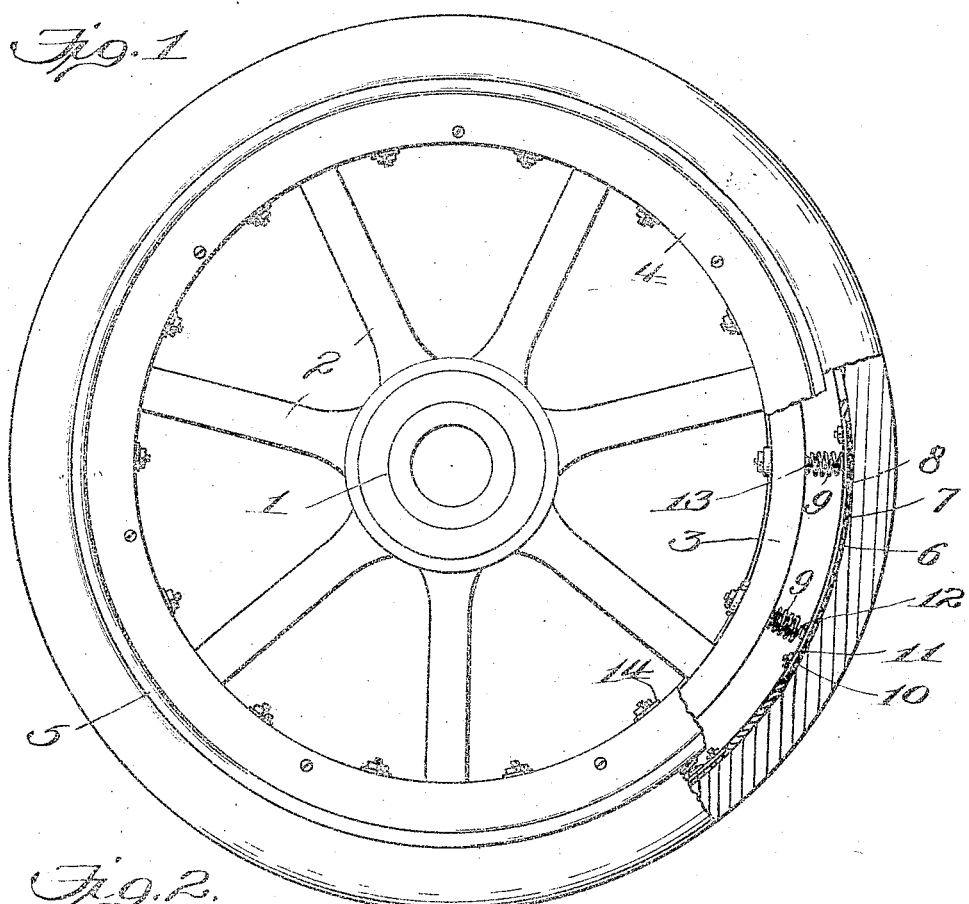
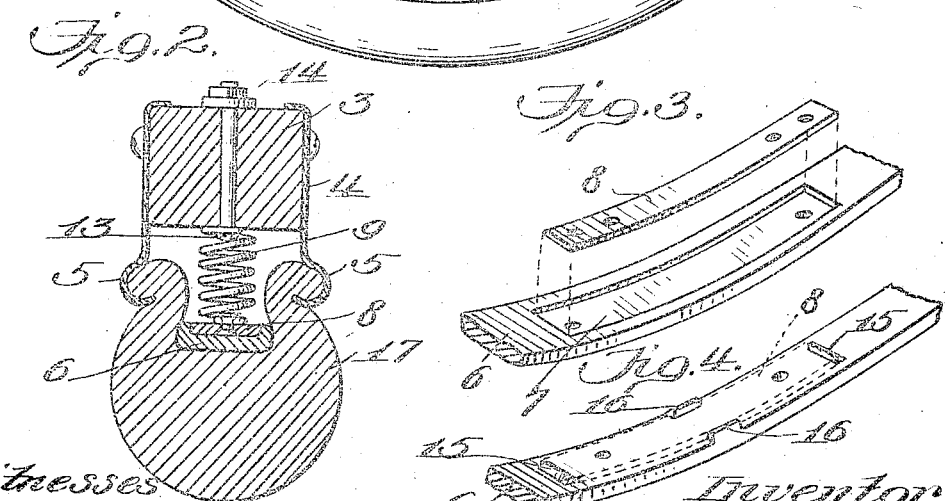

UNITED STATES PATENT OFFICE.

JOSHUA D. MARVIL, OF LAUREL, DELAWARE.

WHEEL-TIRE.

980,805.  Specification of Letters Patent.  Patented Jan. 3, 1911.

Application filed January 18, 1909. Serial No. 472,979.

*To all whom it may concern:*

Be it known that I, JOSHUA D. MARVIL, a citizen of the United States, residing at Laurel, in the county of Sussex and State of Delaware, have invented new and useful Improvements in Wheel-Tires, of which the following is a specification.

This invention relates to wheels and particularly to a yielding or elastic tire for a wheel wherein a cushioning effect is produced without utilizing pneumatic means or an inner inflated tube or chamber under pneumatic pressure.

The primary object of the present invention is to provide a wheel having a conveniently assembled inclosed spring organization or sections carrying springs capable of detachment without removing all of said sections when it is necessary to repair or replace the springs attached to any one of the individual sections and to so seat or apply the sections carrying the springs that shifting movement and wear on the fastening devices for the sections will be prevented. The springs are also inclosed to protect the same, and coöperating therewith is an outer elastic shoe or clencher which serves as a protective means.

With these and other objects and advantages in view, the invention consists in the construction and arrangement of the several parts which will be more fully hereinafter specified and constituting an improvement on the construction illustrated in my Patent Number 925,930, dated June 22, 1909.

In the drawing: Figure 1 is a side elevation of a wheel, partially broken away and shown in section, and embodying the features of the invention. Fig. 2 is a transverse vertical section through the wheel felly and tire portion. Fig. 3 is a detail perspective view of a portion of the outer band of the tire showing one of the spring carrying sections and the manner of forming confining seats in said band to receive the sections. Fig. 4 is a view similar to Fig. 3 of the outer tire band showing a modification in the construction of the confining seats for the spring carrying sections.

The numeral 1 designates a hub having spokes 2 radially projecting therefrom and connected to a felly 3, to which side plates 4 are removably applied and have outer inturned or bent edges 5 to form seats or means for securing the outer shoe or clencher in applied position.

The wheel structure, so far as the hub, spokes and felly are concerned, is not essential and any preferred or suitable form of wheel may be adopted and have the features of the invention applied thereto. Likewise the side plates 4 may be modified in contour and mode of application, and the features of the invention will now be particularly described.

Surrounding the felly 3 at a suitable distance from the latter and in concentric relation thereto is a metal band 6 which is continuous and has formed therein at regular intervals a plurality of confining seats 7, which are constructed by suitable means. Within the seat 7, spring carrying and attaching sections 8 are fitted and secured, said sections consisting of strips of metal longitudinally curved to conform to the contour of the band to which they are applied and of thinner material than the band. As shown in the present instance, two springs 9 are held by each section 8, the said springs 9 having their outer terminals secured to the section. Each section is removably attached to the band, preferably by nutted fastenings 10, having the nutted extremities projected inwardly or the nuts 11 applied against the inner side of each section so as to render the same accessible when it is desired to remove any one of the sections and without dissociating or disturbing the remaining parts and particularly the outer portion of the tire, which will be presently specified.

The spring carrying or supporting sections 8 are provided with headed studs 12 to which the outer ends of the springs 9 are secured, and the inner end of each spring is held in close contact with the outer edge of the felly 3 and engaged by the head of a bolt 13 extending through the felly and engaged by a separable nut and washer 14 exposed at the inner periphery of the felly and whereby the several springs may be released from the felly and each section with a group of springs detached from the band 6 and withdrawn for repair purposes or for replacement by a similar section and springs without removing the remaining springs or requiring a complete disorganization of the tire structure.

The side plates 4 are secured in place by removable fastenings and either one or both may be separated from the felly 3 to expose the rim sections just explained.

A simple modification in the construction of the confining seats 7 is shown by Fig. 4, and consists in striking up end and side lugs 15 and 16 to receive the section 8 between them. Both forms of seats, as particularly shown by Figs. 3 and 4, prevent displacement of the sections either longitudinally or laterally with relation to the band 6. It is obvious that the wheel, when running, would have a tendency to throw the sections 8 out of place if loosely applied against the said band and to impose considerable wearing strain on the fastenings for said sections if no counteracting means is provided. The forms of seats in the band positively retain the sections in applied position and prevent any tendency to movement of the said sections and also relieve the fastenings 11 of wearing strain or liability of shearing or breakage. Over the band an outer tire or clencher 17 of usual form is applied and snugly embraces the band 6 carrying the sections, and has the side edges thereof removably secured in the bent edges 5 of the side plates 4, as clearly shown by Fig. 2. In this improved construction the outer tire or clencher 17 directly bears on the band 6, and the spring carrying sections and springs, together with the band, are fully inclosed by the plates 4 and the said outer tire or clencher, and dust and dirt are thereby excluded from the springs or the space between the outer edge or face of the felly and the secured edges of the outer tire and consequently practical service of the springs will be prolonged.

By the use of the tire organization just explained, the inconveniences and disadvantages arising from the punctures of different portions of pneumatic tires as commonly employed are avoided, as a puncture or a cut in the outer tire or clencher 17 will not impair the usefulness of the tire embodying the features of the invention. Furthermore, the improved tire will withstand greater strain, due to skidding or in making sudden turns, than the ordinary form of tire now used.

The construction hereinbefore described essentially differs from that disclosed in my Patent No. 925,930, dated June 22, 1909, in the use of confining seats for the sections carrying the springs, there being no confining seats disclosed in the said patent.

What is claimed is:

In a wheel, the combination of a felly, a band surrounding and spaced from the felly, a plurality of sections disposed against the inner side of the band and carrying a plurality of springs projecting inwardly to the felly, the band having means on its inner side for preventing movement of the sections both transversely and longitudinally of the band, fastening means for removably securing the sections to the band and protected as to wear by the means for preventing movement of the sections transversely and longitudinally of the band, and fastening devices for securing the terminals of the springs to the sections and for removably holding the springs in connection with the felly.

In testimony whereof I have hereunto set my hand in presence of two subscribing witnesses.

JOSHUA D. MARVIL.

Witnesses:
 JOHN T. MELSON,
 FRANK B. SIBMAN.